(12) United States Patent
Lauder et al.

(10) Patent No.: US 7,909,308 B2
(45) Date of Patent: Mar. 22, 2011

(54) WINCH SYSTEM FOR VTOL AIRCRAFT

(75) Inventors: Timothy F. Lauder, Oxford, CT (US); Janiece M. Lorey, New Haven, CT (US); Christopher M. Harrington, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 12/527,612

(22) PCT Filed: Apr. 19, 2007

(86) PCT No.: PCT/US2007/066937
§ 371 (c)(1),
(2), (4) Date: Aug. 18, 2009

(87) PCT Pub. No.: WO2008/130402
PCT Pub. Date: Oct. 30, 2008

(65) Prior Publication Data
US 2010/0051890 A1 Mar. 4, 2010

(51) Int. Cl.
*B66D 3/00* (2006.01)
*B66D 1/26* (2006.01)
*B65H 75/18* (2006.01)

(52) U.S. Cl. ......... 254/382; 254/278; 254/334; 242/603

(58) Field of Classification Search .................. 254/382, 254/278, 334; 242/603
See application file for complete search history.

(56) References Cited

U.S. PATENT DOCUMENTS

| 3,960,340 | A | 6/1976 | Naas |
| 7,100,901 | B2 | 9/2006 | Gleinser |
| 2006/0226278 | A1 | 10/2006 | Van Der Laan |

FOREIGN PATENT DOCUMENTS

DE 2717157 9/1978

OTHER PUBLICATIONS

Search Report and Written Opinion mailed on Sep. 2, 2008 for PCT/US2007/066937.
Markey, Michael. "Ch. 10, Single Drum Winch Design" Handbook of Oceanographic Winch, Wire and Cable Technology. Ed. John F. Bash 3rd ed. 2001.
Stasny, James. "Ch. 11, Double Drum Traction Winch Systems for Oceanographic Research", Handbook of Oceanographic Winch, and Cable Technololgy. Ed. John F. Bash. 3rd ed. 2001.
Website: www.wrca.com.
Nice, Karim. "How Automatic Transmissions Work." Nov. 29, 200. HowStuffWorks.com http://autohowstuffworks.com/automatic-transmission.htm Aug. 25, 2009.
Website: http://www.dsm.com.
Website: http://www.gore.com.

(Continued)

*Primary Examiner* — Evan H Langdon
(74) *Attorney, Agent, or Firm* — Carlson Gaskey & Olds PC

(57) ABSTRACT

A winch system includes a cable storage system (34), a drive system (30) and a deployment system to deploy a cable having a hook system attached thereto. A right angle sheave (46) guides the cable between the cable storage system and the drive system. The drive system includes a dual mode transmission that provides high speed capabilities when moderate to no load is being lifted, while also providing high torque for heavy lift operations at low speeds. The deployment system is rated to support a maximum hook load and is mounted to the airframe for pivotable movement about a deployment axis to enable large cable exit angles.

26 Claims, 16 Drawing Sheets

OTHER PUBLICATIONS

Website: http://harmonicdrive.net.
Website: http://hoistandwinch.com.
Website: http://www.interoceansystems.com.
Website: http://www.jeamar.com.
Website: http://www.kellywirerope.com.
Website: http://www.radioworks.com.
Website: http://www.rasmusenco.com.
Website: http://www.teufelberger.com.
Website: http://thecortlandcompanies.com.

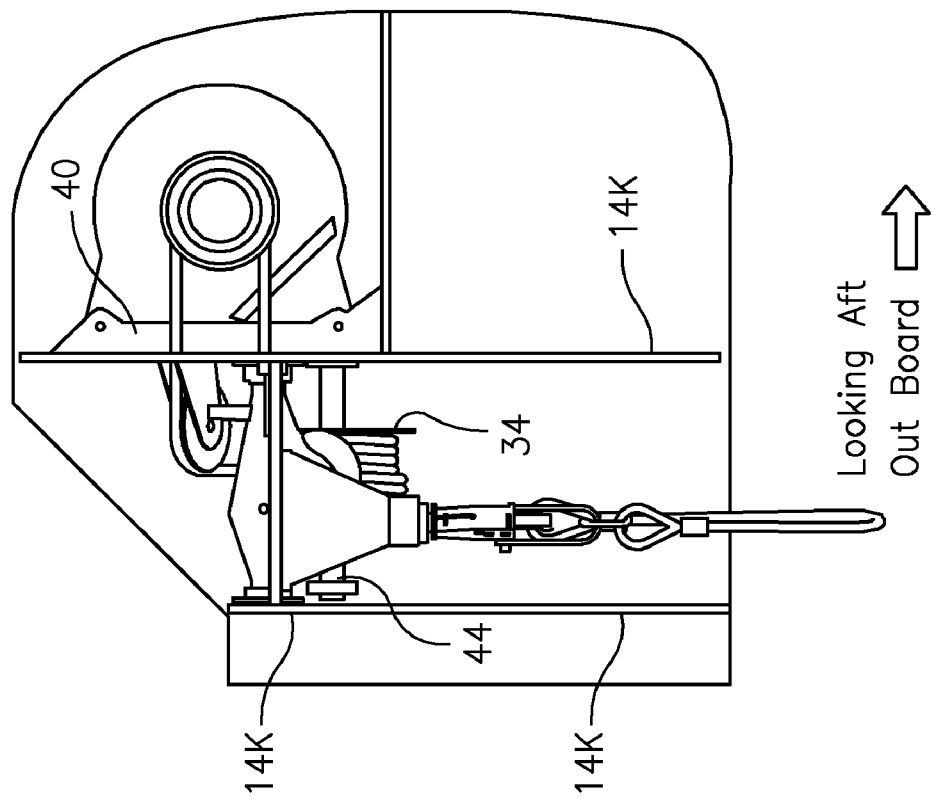
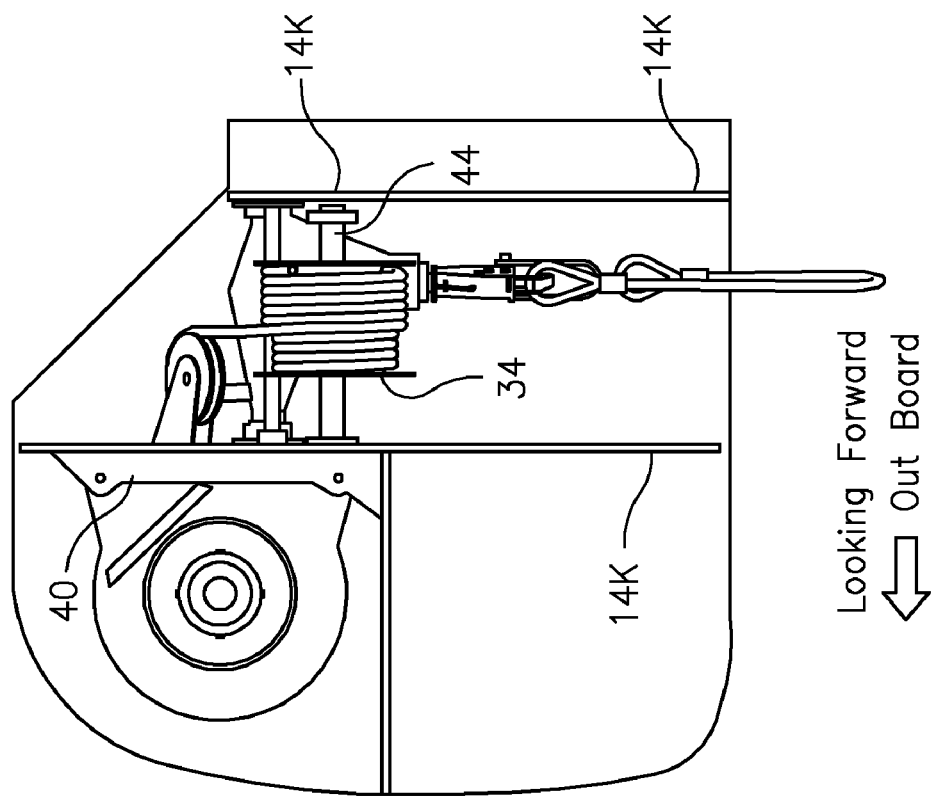

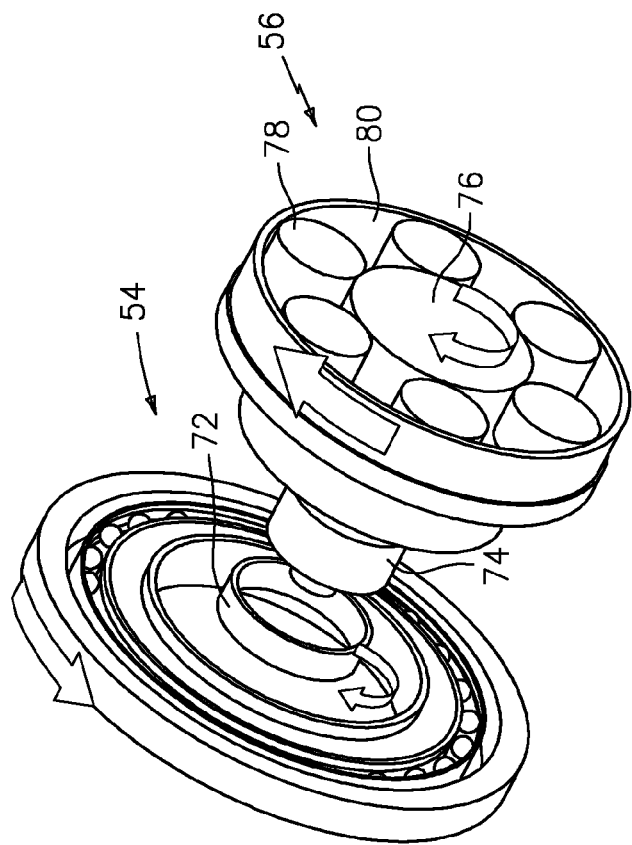
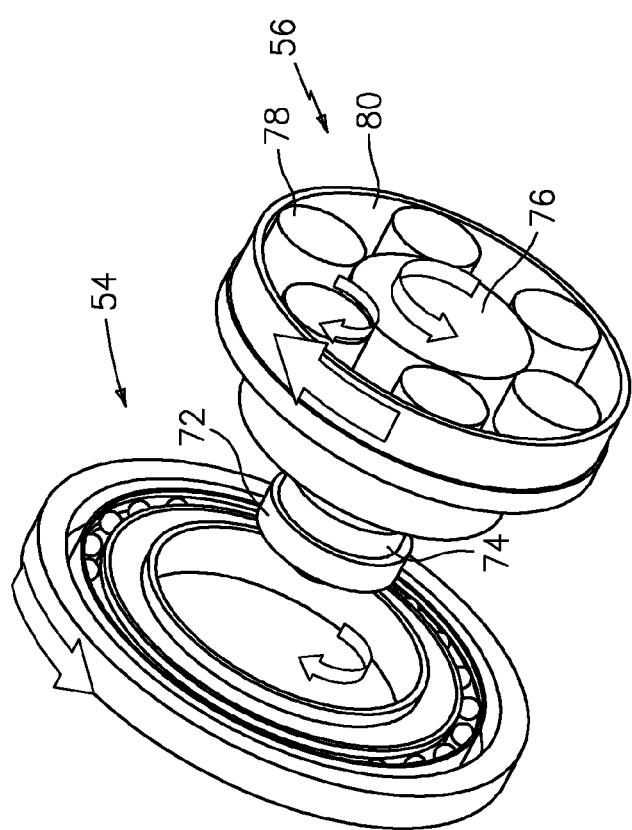
FIG. 9A
FIG. 9B

WINCH SYSTEM FOR VTOL AIRCRAFT

This invention was made with government support under Contract No.:W911W6-05-2-0007 with the United States Army. The government therefore has certain rights in this invention.

BACKGROUND OF THE INVENTION

The present invention relates to external load operations, and more particularly to a winch system for use with Vertical Takeoff and Landing (VTOL) aircraft.

Vertical takeoff and landing (VTOL) aircraft such as, helicopters, co-axial counter rotating aircrafts, tilt-rotors, tilt-wings, etc., are unique in their ability to carry loads externally. Future military forces require enhanced vertical lift capabilities in a compact package. Super heavy lift (SHL) rotary-wing aircraft are generally defined as an aircraft with future payload capacities in the range of over 80,000 pounds of payload over a 400 mile range.

External load operations provide a rapid procedure to load, transport, and unload cargo. Frequently, one or more winch systems having cables with cargo hooks at an end thereof attach the payload to the aircraft for transportation. Winching systems having such future payload capacities need to be compact and relatively lightweight to package a multiple of winch systems within the VTOL aircraft. The multiple of winch systems are utilized to transport payloads expected of the future requirements.

Winch systems traditionally utilize a Fairlead (vertical and horizontal guide rollers) to smoothly spool the cable onto a drum. The diameter of the guide rollers of the Fairlead mechanisms are typically much smaller than the cables minimum bend radius (D/d) which limits the angular displacements to angles less than 3° to 5°. This is adequate for conventional, centrally aligned lift operations with minimal cable angle direction change, but cannot provide relatively large angles and short cable lengths necessary to meet future requirements in which a multiple of winch systems are attached to payloads expected of the future requirements. These payloads may include expensive vehicles that may be manned during flight such that the need for improvements in winch system drive technology, cable handling, cable angle capability, safety, and reliability become of increased importance.

Accordingly, it is desirable to provide a compact and relatively lightweight winch system capable of future load requirements which can be readily packaged within a VTOL aircraft for quad operation with relatively large cable angle direction change.

SUMMARY OF THE INVENTION

The traction winch system according to the present invention generally includes a cable storage system, a drive system and a deployment system to deploy a cable having a hook system attached to an end segment thereof. The traction winch system provides low-cable tension which increases the accuracy and repeatability of a level wind to provide gentle spooling and increases cable life. In addition, the low cable tension eliminates the tendency to bury the outer layer of rope into the previous layer (a trend known as knifing) which also increases cable life by avoiding wear-inducing piling.

The cable storage system includes a cable storage drum that oscillates along a cable storage drum support shaft to provide the level wind capability. A right angle sheave guides the cable between the cable storage system and the drive system. The drive system includes a drive motor which drives a traction drive capstan through a dual mode transmission defined along a drive axis of rotation transverse to the cable storage axis of rotation.

The dual mode transmission provides high speed capabilities when moderate to no load is being lifted, while also providing the high torque necessary for heavy lift operations at low speeds. The drive system is capable of hoisting a 40.0-ton load at 1.0 fps winch rate as well as a 22.4-ton load at 2.0 fps winch rate.

Torque (cable pull) and RPM (cable speed) are transferred through the deployment system which is located on an output side of the drive system. The deployment system is rated to support a maximum hook load and is mounted to the airframe for pivotable movement about a deployment axis generally transverse to the aircraft longitudinal axis. From the deployment system, the cable exits the aircraft. This configuration provides significant cable exit angles, both lateral and longitudinally while contributing to the systems load-out flexibility.

An emergency release guillotine system is integrated into the deployment system. In an emergency, once activated, the cable need only pass by a tension roller system and a spring loaded positioning arm, both applying minimal friction force to the system.

A hook support saddle system movable between a deployed position and a retracted position is mounted adjacent the deployment system to grasp the hook system and constrain movement thereof relative the airframe whilst said hook is idle.

The present invention therefore provides a compact and relatively lightweight winch system capable of future load requirements which can be readily packaged within a VTOL aircraft for quad operation with relatively large cable angle direction change.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 5A is a side view of the winch system mounted within an aircraft airframe looking forward;

FIG. 5B is a side view of the winch system mounted within an aircraft airframe looking aft;

FIG. 9A is a perspective exploded view of the dual mode transmission of FIG. 8A illustrating a cage lock in an engaged position to provide a low speed, high torque mode with a 2:1 reduction ratio;

FIG. 9B is a perspective exploded view of the dual mode transmission of FIG. 8B illustrating a cage lock in a disengaged position to provide a high speed, low torque mode with a 1:1 reduction ratio;

DETAILED DESCRIPTION OF THE DISCLOSED EMBODIMENT

Figure 1A:
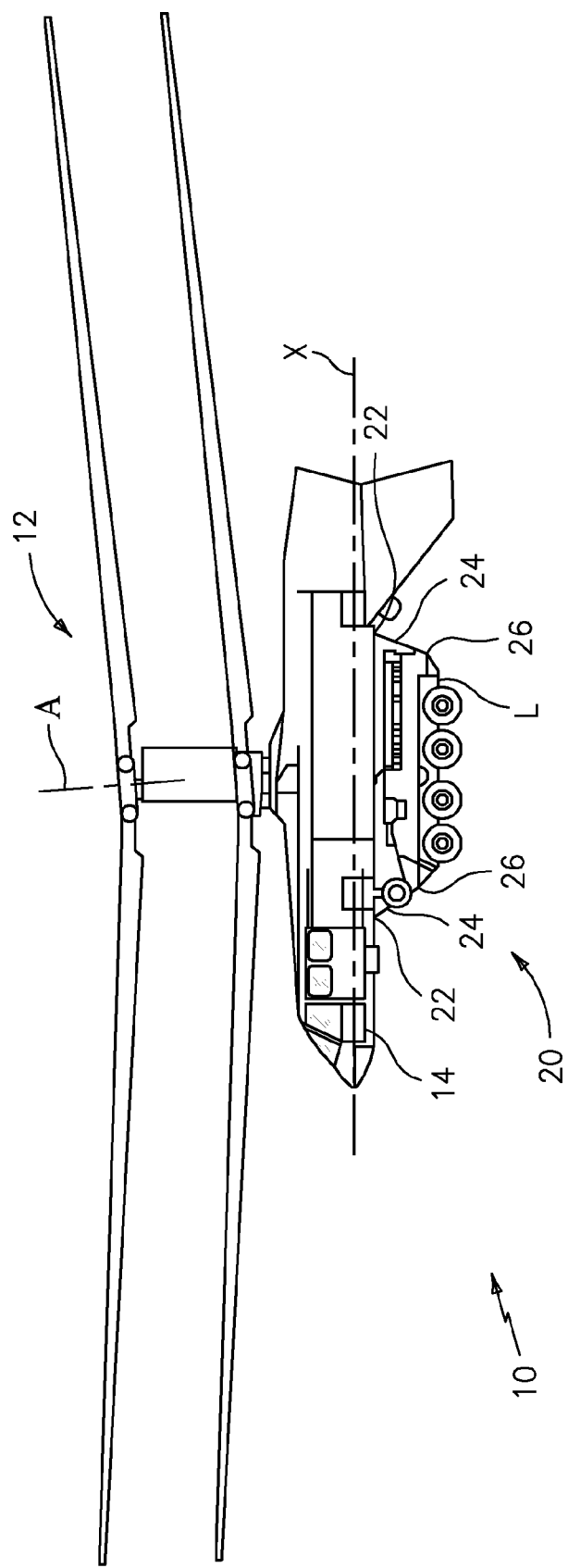
FIG. 1A is a general perspective view of an exemplary rotary wing aircraft embodiment with an external load for use with the winch system according to the present invention.
Figure 1B:
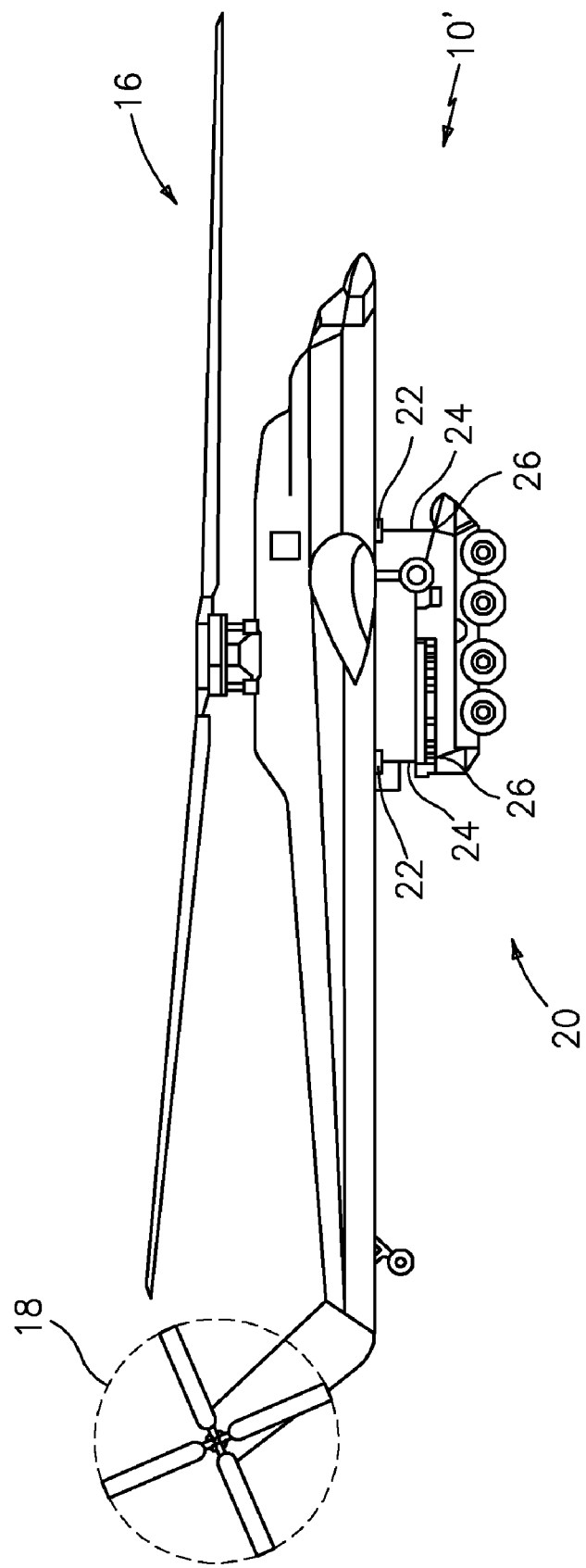
FIG. 1B is a general perspective view of another exemplary rotary wing aircraft embodiment with an external load for use with the winch system according to the present invention.

FIG. 1A schematically illustrates a rotary-wing aircraft 10 having a dual, counter-rotating, coaxial rotor system 12 mounted to an airframe 14. The dual, counter-rotating, coaxial rotor system 12 includes an upper rotor system and a lower rotor system upon an essentially tailless fuselage which facilitates shipboard compatibility. Although a particular type of rotary-wing aircraft configuration is illustrated in the disclosed embodiment, other aircraft such as helicopters 10' having a single main rotor assembly 16 and an anti-torque rotor 18 (FIG. 1B), high speed compound rotary wing aircraft with supplemental translational thrust systems, dual contra-rotating, coaxial rotor system aircraft, flying cranes, turbo-props, tilt-rotors and tilt-wing aircraft, will also benefit from the present invention.

An external load L is slung from the airframe 14 generally along an aircraft longitudinal axis X through an external cargo hook system 20 having a multitude of winch systems 22 which each deploy a cable 24. Each cable 24 is connectable to an external load or loads through a hook system 26.

Figure 2A:
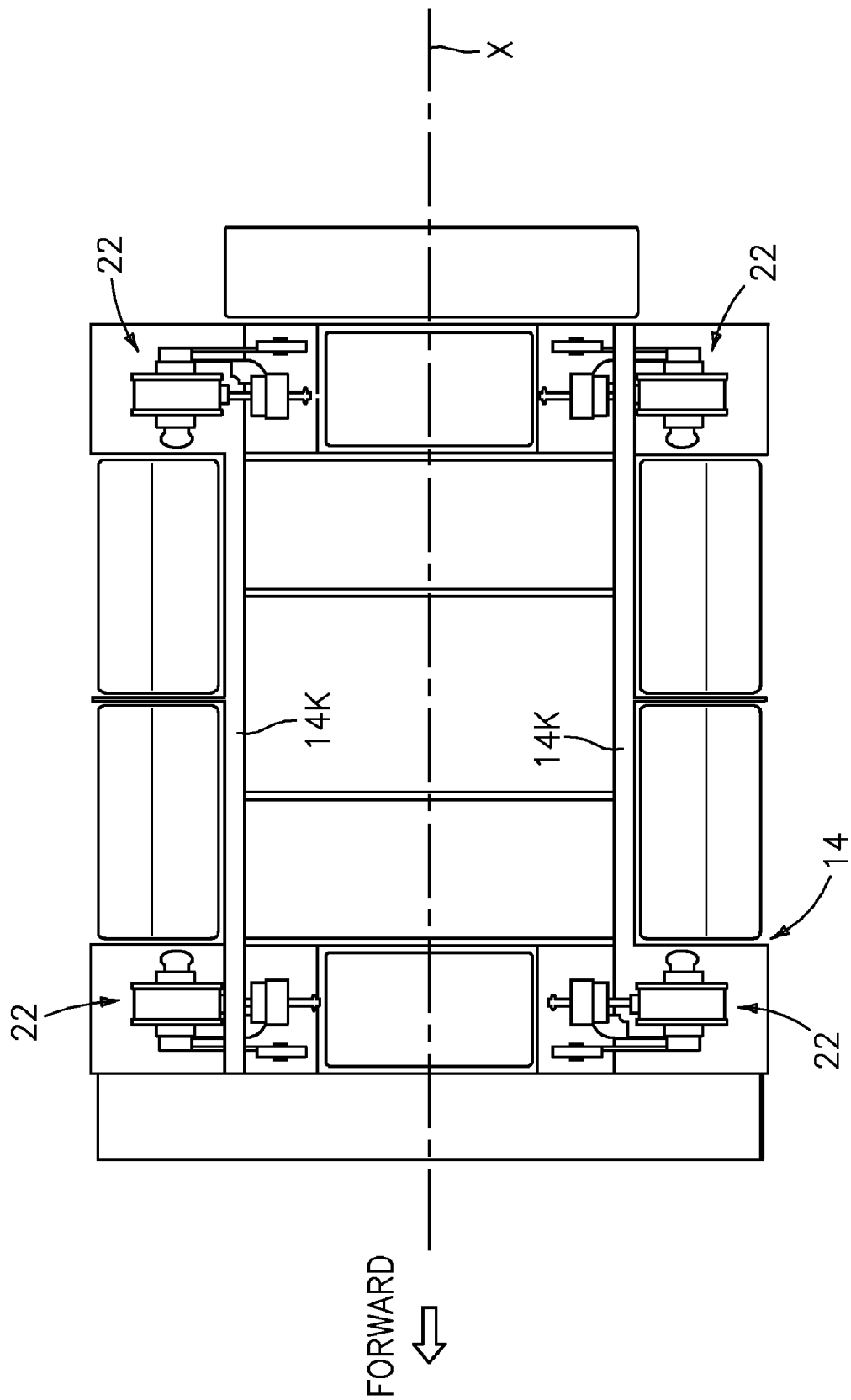
FIG. 2A is a top sectional view of an exemplary rotary wing aircraft airframe illustrating a quad winch arrangement according to the present invention.
Figure 2B:
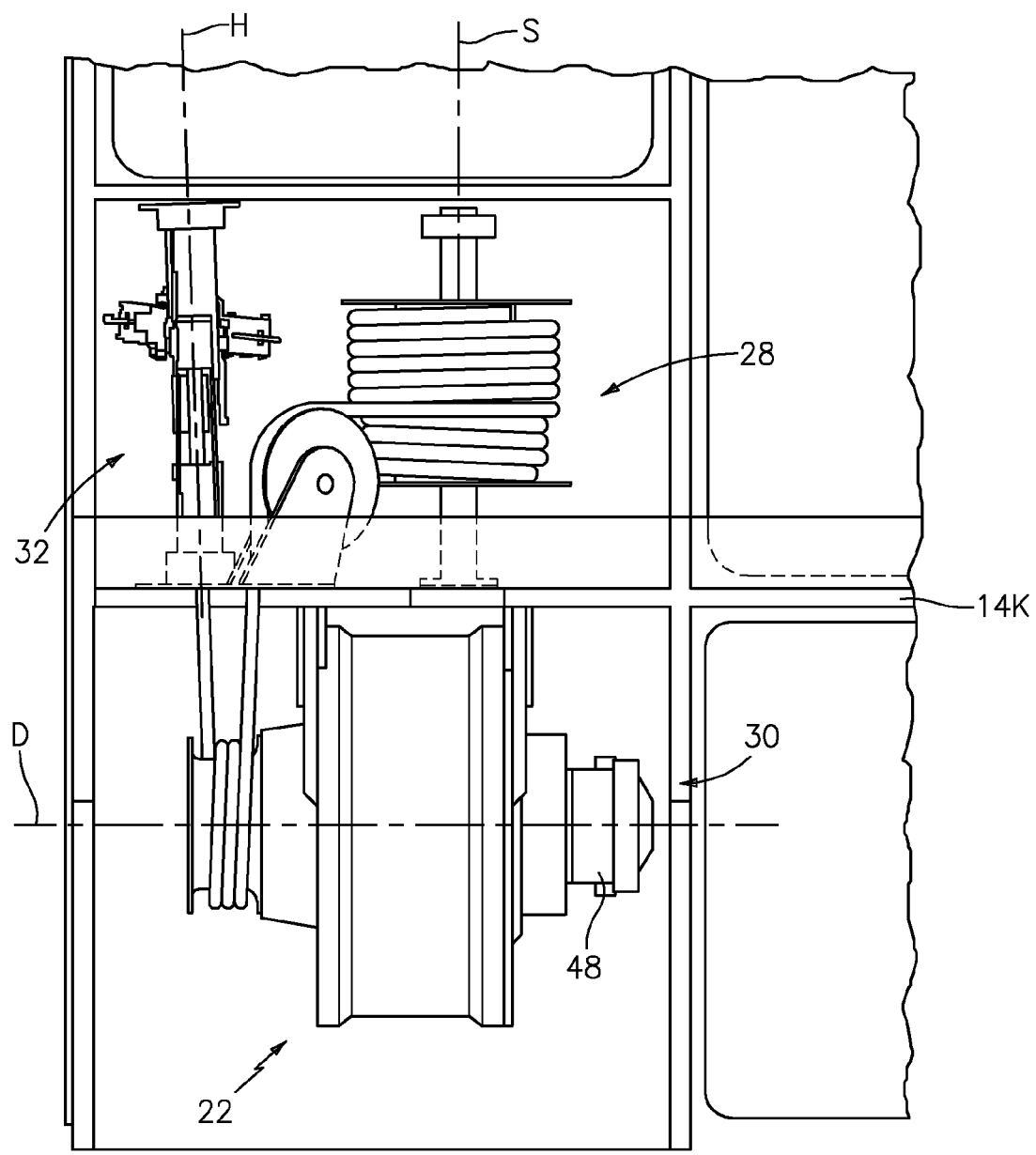
FIG. 2B is an expanded top view of one winch system.

Referring to FIG. 2A, a multiple of winch systems 22 (the forward port winch system 22 illustrated alone in FIG. 2B) are arranged to provide for a four-point load attachment in the disclosed embodiment and facilitate large cable exit angles, both lateral and longitudinally, while contributing to the systems overall load-out flexibility. Although a quad winch system is disclosed in the illustrated embodiment, it should be understood that any number of winch systems 22 may be utilized in the aircraft 10.

Figure 3:
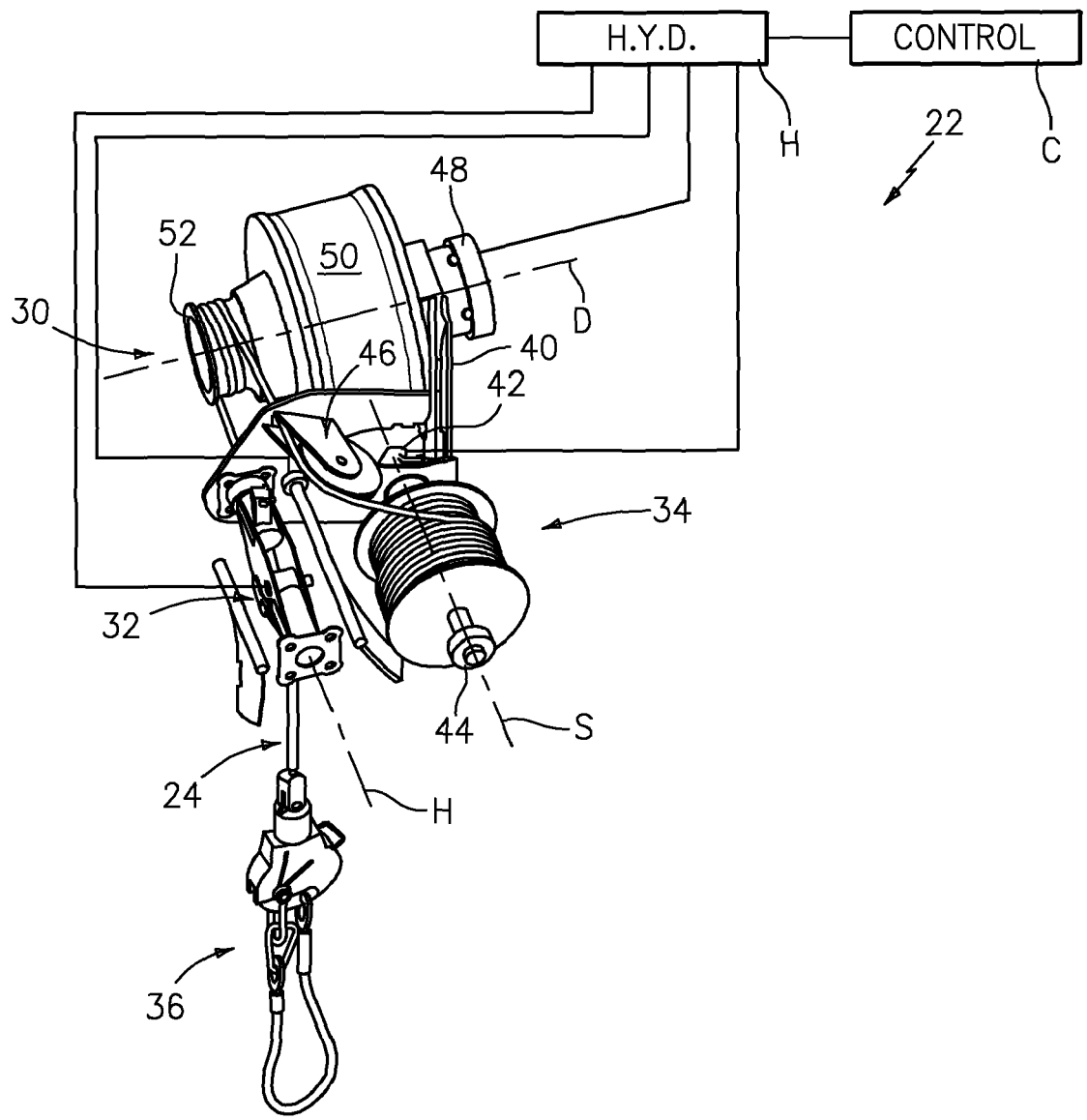
FIG. 3 is a perspective view of a winch system according to the present invention.

Referring to FIG. 3, each winch system 22 generally includes a cable storage system 28, a drive system 30 and a deployment system 32 to deploy the cable 24 having the hook system 36 attached to an end segment thereof. The winch system 22 may be sized to contain over 100 feet of deployable cable 24, plus the necessary length to route the cable through the winch system 22. The cable 24 may be a rope made with Dyneema® which is as strong as a wire rope, with the same diameter but only about 10% of the weight per unit length. The winch system 22 provides gentle spooling as a result of low-cable tension which increases the accuracy and repeatability of the level wind, which increases cable life. In addition, the low cable tension eliminates the tendency to bury the outer layer of cable into the previous layer (a trend known as knifing) which also increases the cable life by avoiding wear-inducing piling.

Figure 4:
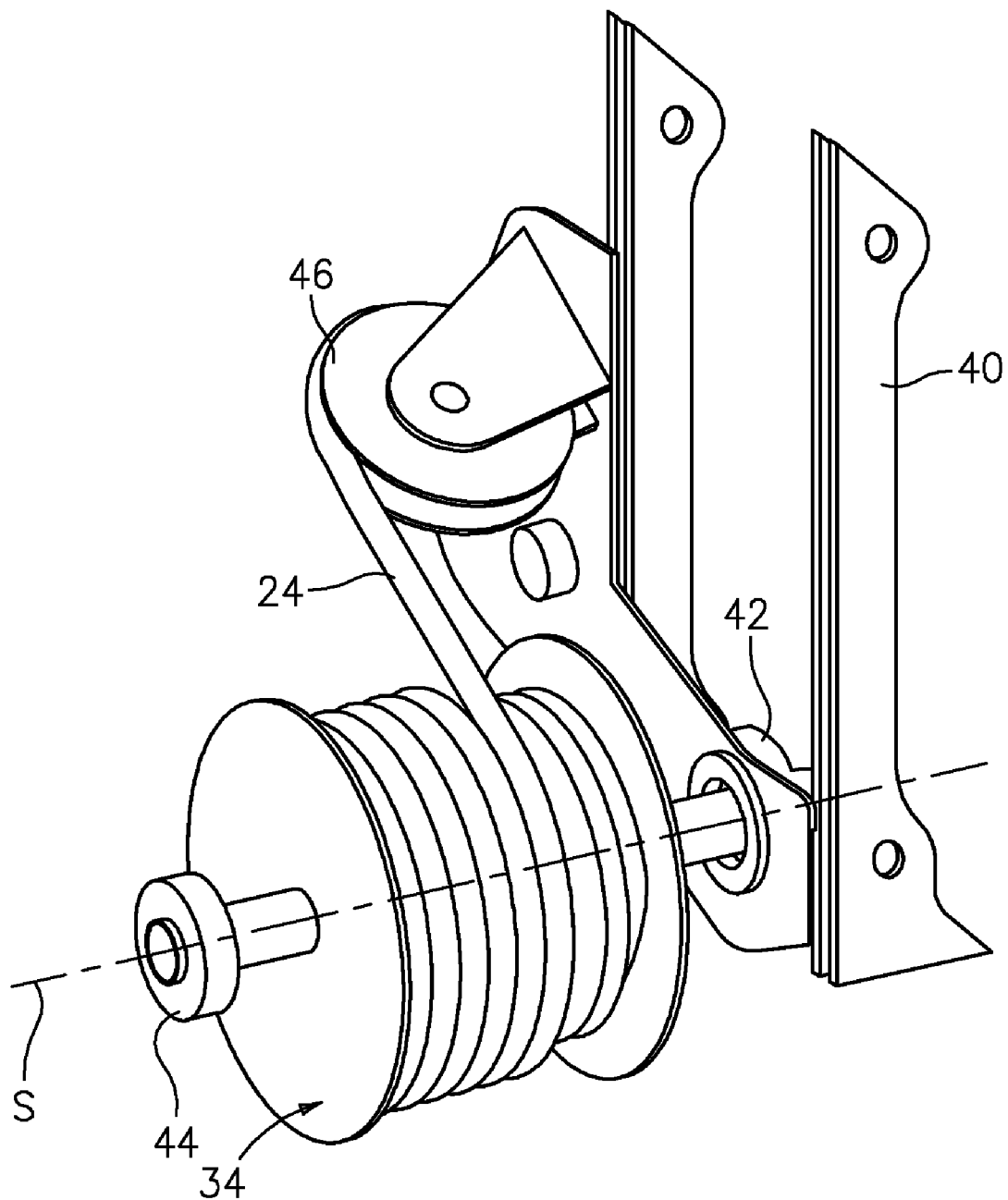
FIG. 4 is an expanded perspective view of a cable storage system.

The cable storage system 28 generally includes a cable storage drum 34 supported on a winch frame 40 mounted to the airframe 14 (FIG. 4). The winch frame 40 is mounted to an airframe keel beam 14K in the disclosed embodiment (FIGS. 5A and 5B).

The cable storage drum 34 is supported upon a cable storage drum support shaft 44 which defines a cable storage system axis of rotation S. A cable storage system drive 42 rotates the cable storage drum 34 about the cable storage system axis of rotation S. The cable storage drum 34 also oscillates along the cable storage drum support shaft 44 in response to the cable storage system drive 42 to provide a level wind capability. Smooth cable spooling may additionally be provided by the incorporation of grooved shells such as those manufactured by Lebus Intl. Inc. of Longview, Tex. USA to provide further precision in level wind tracking.

A right angle sheave 46 is supported by the winch frame 40 guides the cable between the cable storage system 28 and the drive system 30. The winch cable spools from and onto the oscillating cable storage drum 34, passes around the right angle sheave 46 and connects (wraps) to the drive system 30. In the disclosed embodiment, the right angle sheave 46 guides the cable around an approximately ninety degree bend, however, other bends may alternatively be provided.

The drive system 30 generally includes a drive motor 48 connected to a dual mode transmission 50 and a traction drive capstan 52 defined along a drive axis of rotation D transverse to the cable storage axis of rotation S. The dual mode transmission 50 provides high speed capabilities when moderate to no load is being lifted, while also providing the high torque necessary for heavy lift operations at low speeds. The drive system 30 in the illustrated embodiment is capable of hoisting a 40.0-ton load at 1.0 fps winch rate as well as a 22.4-ton load at 2.0 fps winch rate.

The drive motor 48 in the disclosed embodiment is hydraulically driven and sized to the cargo load Drive Unit Criteria of 44,800 lb. The hydraulic system H interfaces with a winch control system C that manages various winch operational characteristics including traction drive capstan cable tension, storage winch cable tension and level wind, as well as cable feedback data such as cable tension, speed payout length, and cable angle.

The traction drive capstan 52 is a friction drive device. The friction force is equivalent to the cable tension and is derived from the arc of contact of the capstan, the friction coefficient and the back tension of the inbound cable end. The traction drive capstan 52 provides constant cable tension and constant cable speed throughout the winching operation. This allows the cable to be stowed in multiple layers under low cable tension which is approximately 10% of the outbound cable load. The capstans barrel diameter, as said sheave, is proportional to the d/D minimum, the barrel length is a function of the arc-of-contact and the flange geometry is impacted by the cable helix angle. For ease of cable replacement, the traction drive output is cantilevered from the transmission housing 58.

Figure 6:
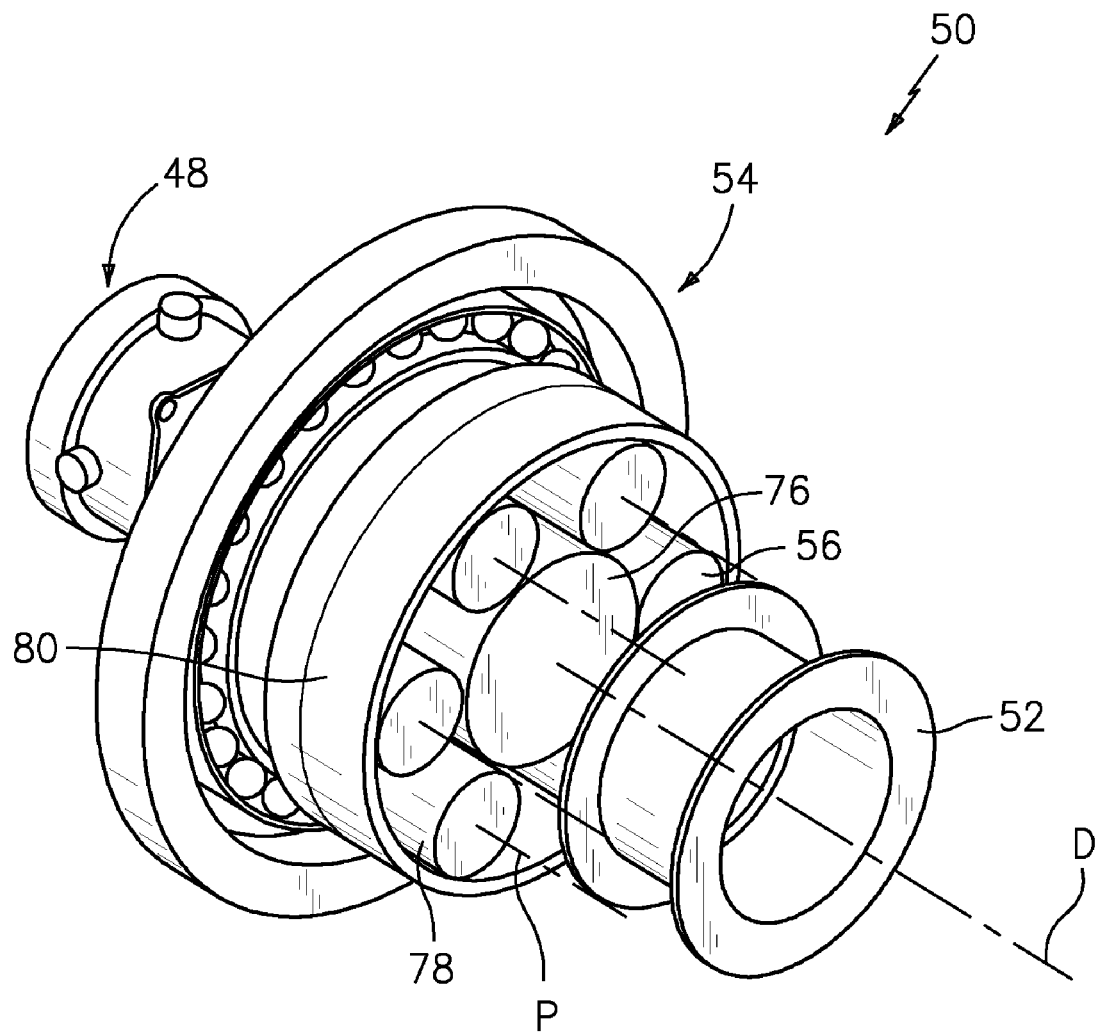
FIG. 6 is a perspective exploded view of a dual mode transmission for the winch system according to the present invention.
Figure 7A:
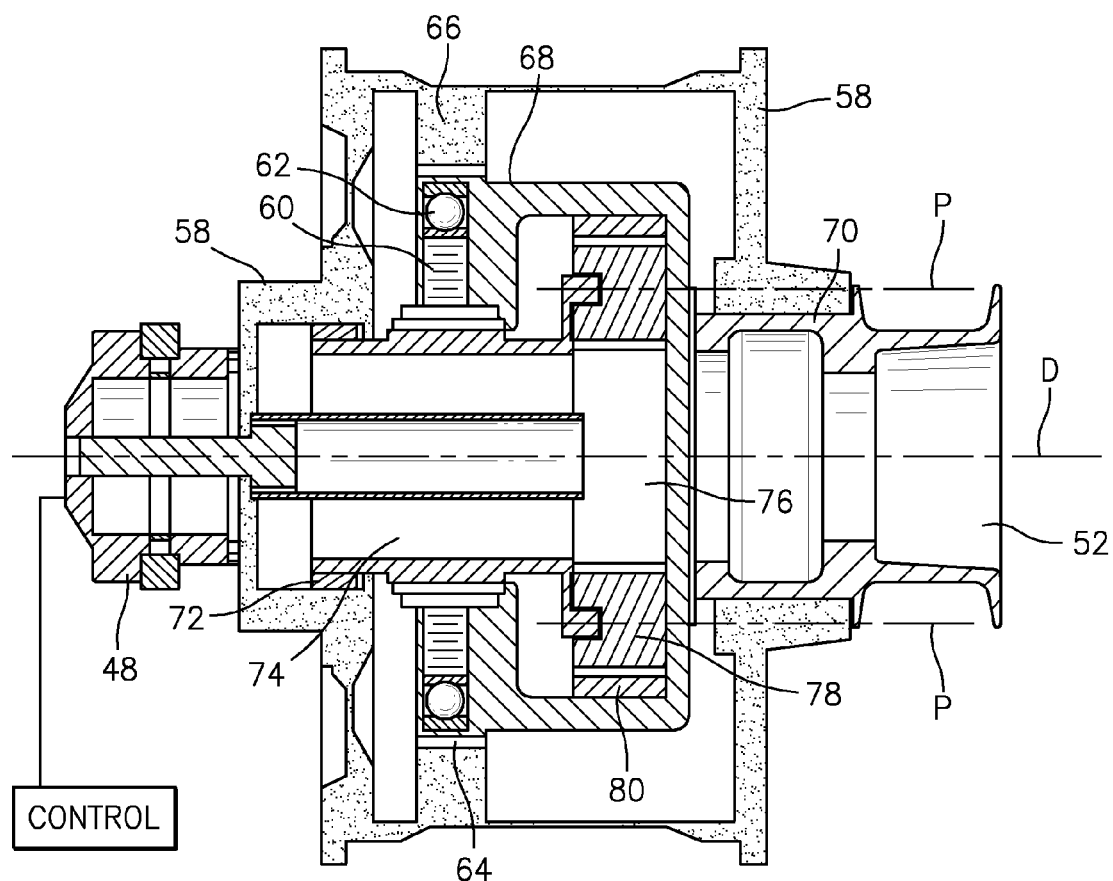
FIG. 7A is a sectional view of the dual mode transmission.

The dual mode transmission 50 includes a harmonic drive system 54 (elastic deflection) in combination with a planetary gear system 56 (rigid body dynamics) (FIG. 6) within a single transmission housing 58 (FIG. 7A). The systems 54 and 56 are nested to maximize volumetric efficiency. The output of the planetary system 56 is transferred through the ring gear 80 to the harmonic drive input spline 61. The planetary gear system 56 serves as the input drive and the harmonic drive system 54 serves as the final drive. The harmonic drive system 54 provides relatively large reduction ratios in a single mesh while the planetary gear system 56 provides differential speeds.

Figure 7B:
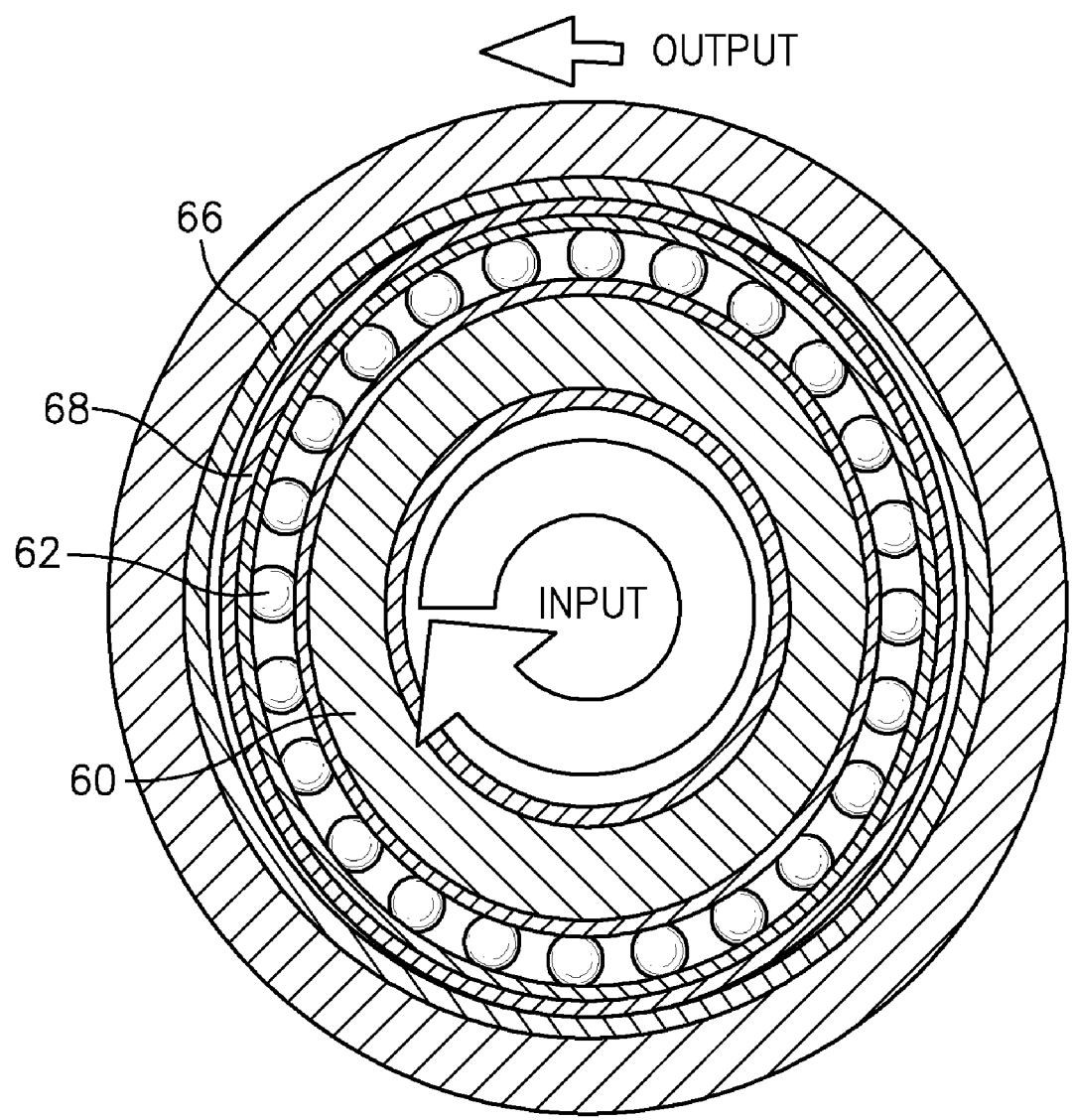
FIG. 7B is a frontal view of a harmonic drive of the dual mode transmission.

Referring to FIG. 7A, the harmonic drive system 54 utilizes controlled elastic deflection. The harmonic drive system 54 generally includes an ellipsoidal wave generator (cam) 60, a flex bearing 62, a flex spline 68, a circular spline (internal ring gear) 66, an integrated coupling 68 and an output shaft 70. The flex spline 68 has fewer teeth—two fewer than the circular spline 66 in the disclosed embodiment. The number of fewer teeth is equal to the number of lobes of the wave generator. The flex spline 68 and circular spline 66 are engaged at the major axis of the wave generator 60 and are disengaged (clear) at the minor axis (FIG. 7B). As the wave generator 60 rotates, the flex spline 68 counter rotates. A full rotation of the wave generator 60 produces a flex spline 68 counter rotation angle equivalent to two of its total teeth such that the reduction ratio is the number of flex spline teeth divided by 2.

Figure 8A:
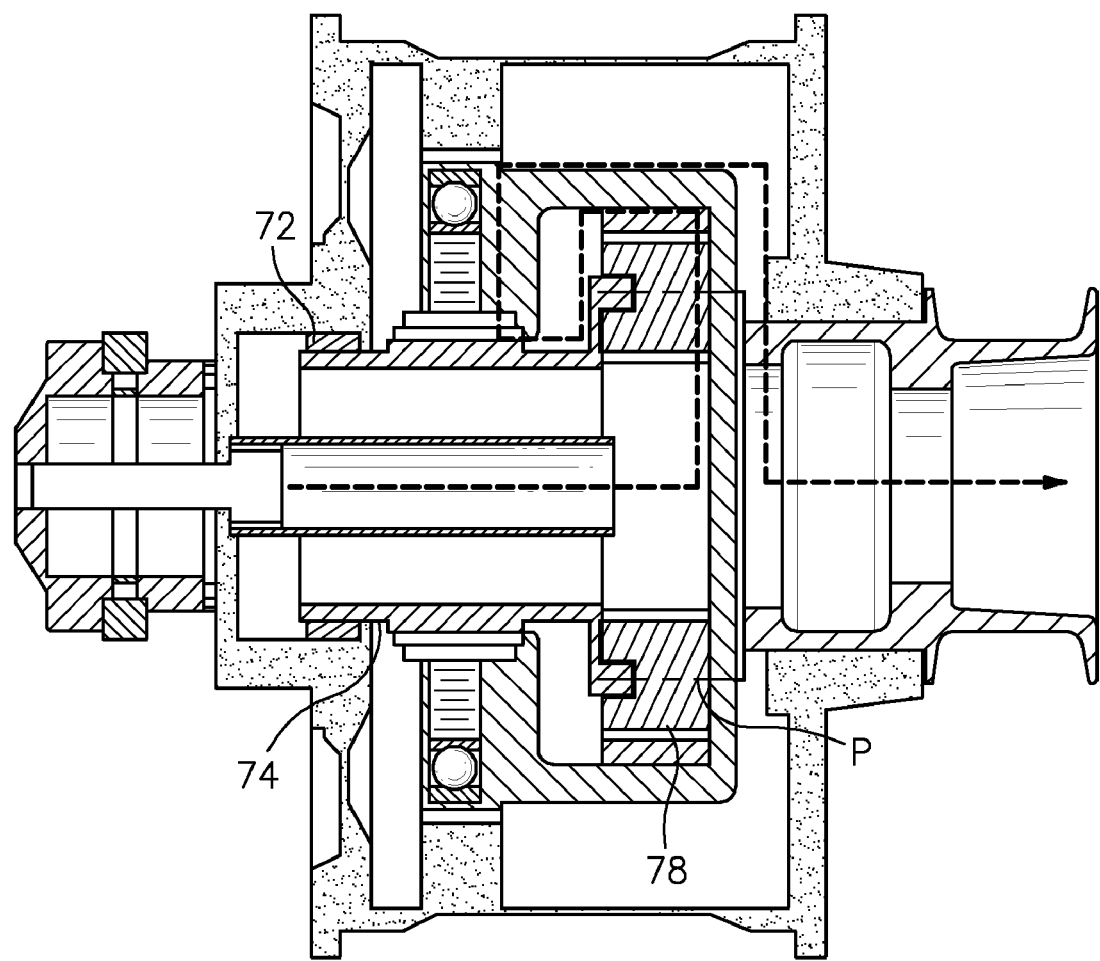
FIG. 8A is a sectional view of the dual mode transmission of FIG. 7 illustrating a torque drive path for a low speed, high torque mode.
Figure 8B:
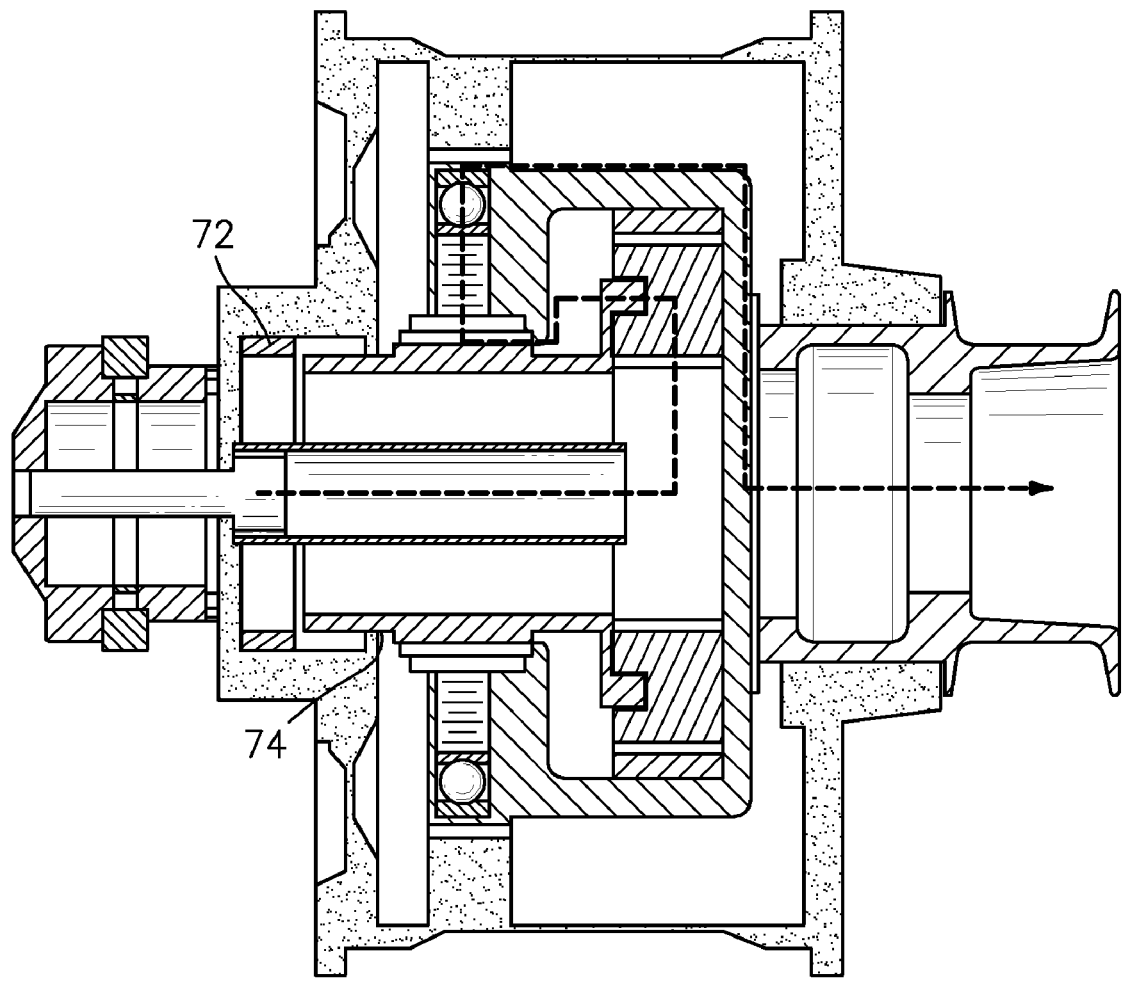
FIG. 8B is a sectional view of the dual mode transmission of FIG. 7 illustrating a torque drive path for a high speed, low torque mode.

The Dual Mode Transmission 50 operates at a High Torque/Low Speed mode (FIG. 8A) and Low Torque/High Speed mode (FIG. 8B). For high torque/low speed operations, a cage lock 72 locks a planetary gear cage 74 which supports the multiple of planet gears 78 within the ring gear 80. The cage lock 72 is an axially movable locking spline which respectively locks (FIG. 8A) and unlocks (FIG. 8B) the planetary gear cage 74 and thereby the planetary gear system 56.

Torque from the drive motor 48 is transferred to a sun gear 76 of the planetary gear system 56. When the planetary gear cage 74 is locked from rotation, planet gears 78 rotate about each respective planet axis P to drive the ring gear 80 (FIG. 9A) and provide a 2:1 reduction ratio in the disclosed embodiment. The reduction ratio is equivalent to the number of teeth in the ring gear 80 divided by the number of teeth in the sun gear 76.

During low torque/high speed operations, the cage lock 72 is disengaged from the planetary gear cage 74, the planet gears 78 do not individually rotate but the ring gear 80 is directly rotated by the sun gear 76. The entire planetary gear system 56 rotates about a sun gear axis D to provide a direct 1:1 drive ratio (FIG. 9B).

Figure 10:
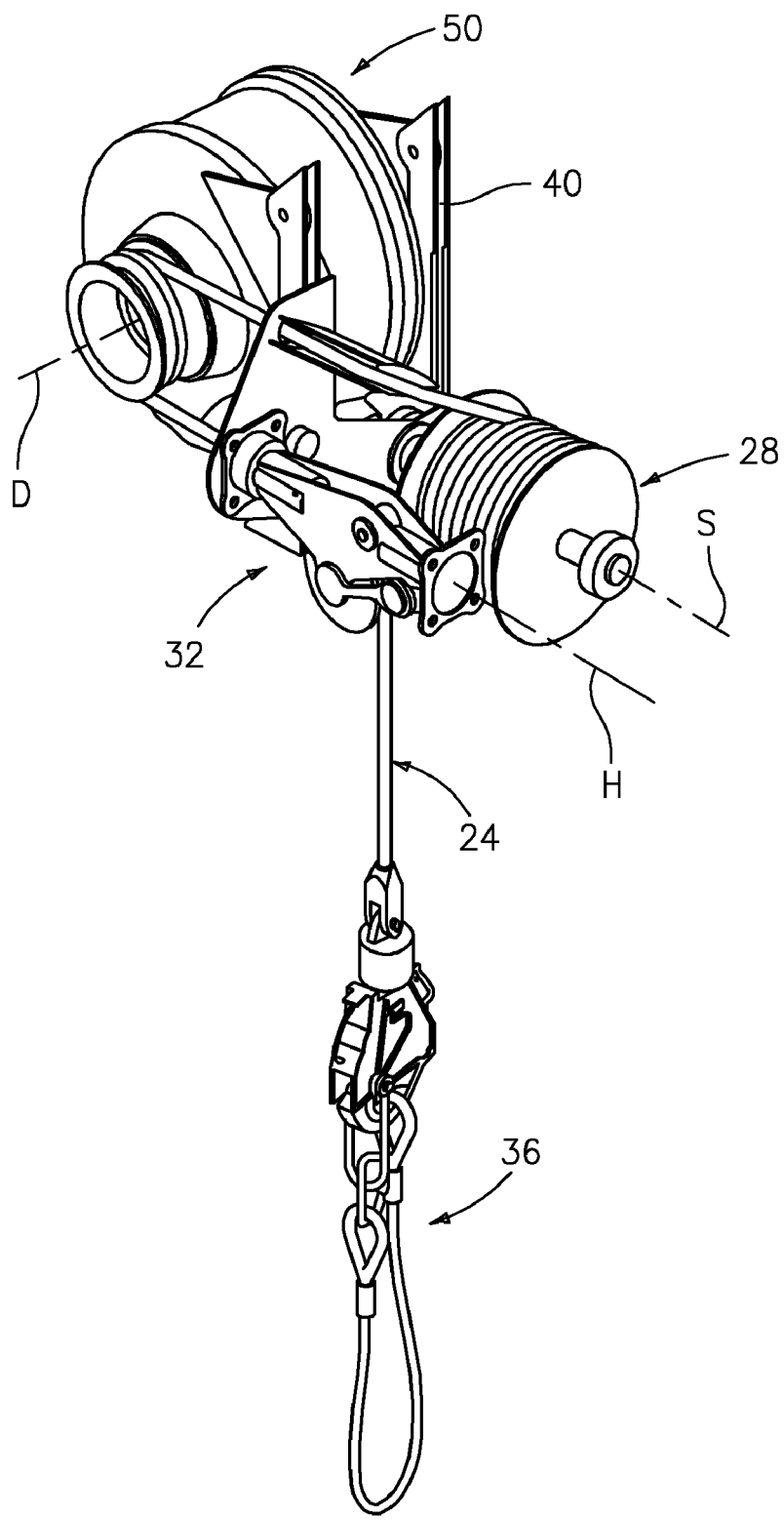
FIG. 10 is a perspective view of the winch drive system illustrating a deployment system.

Referring to FIG. 10, torque (cable pull) and RPM (cable speed) are transferred through the deployment system 32 which is located on an output side of the drive system 30. The deployment system 32 is rated to support a maximum hook load and is mounted to the airframe 14 for pivotable movement about a deployment axis H generally transverse to the drive axis of rotation D. The deployment axis H is generally transverse to the aircraft longitudinal axis X (FIG. 2). From the deployment system 32, the cable 24 and hook system 36 exit the aircraft 10. This configuration, replaces the traditional exit guide rollers and enables large cable exit angles, both lateral and longitudinally while contributing to the systems overall load-out flexibility.

Figure 11:
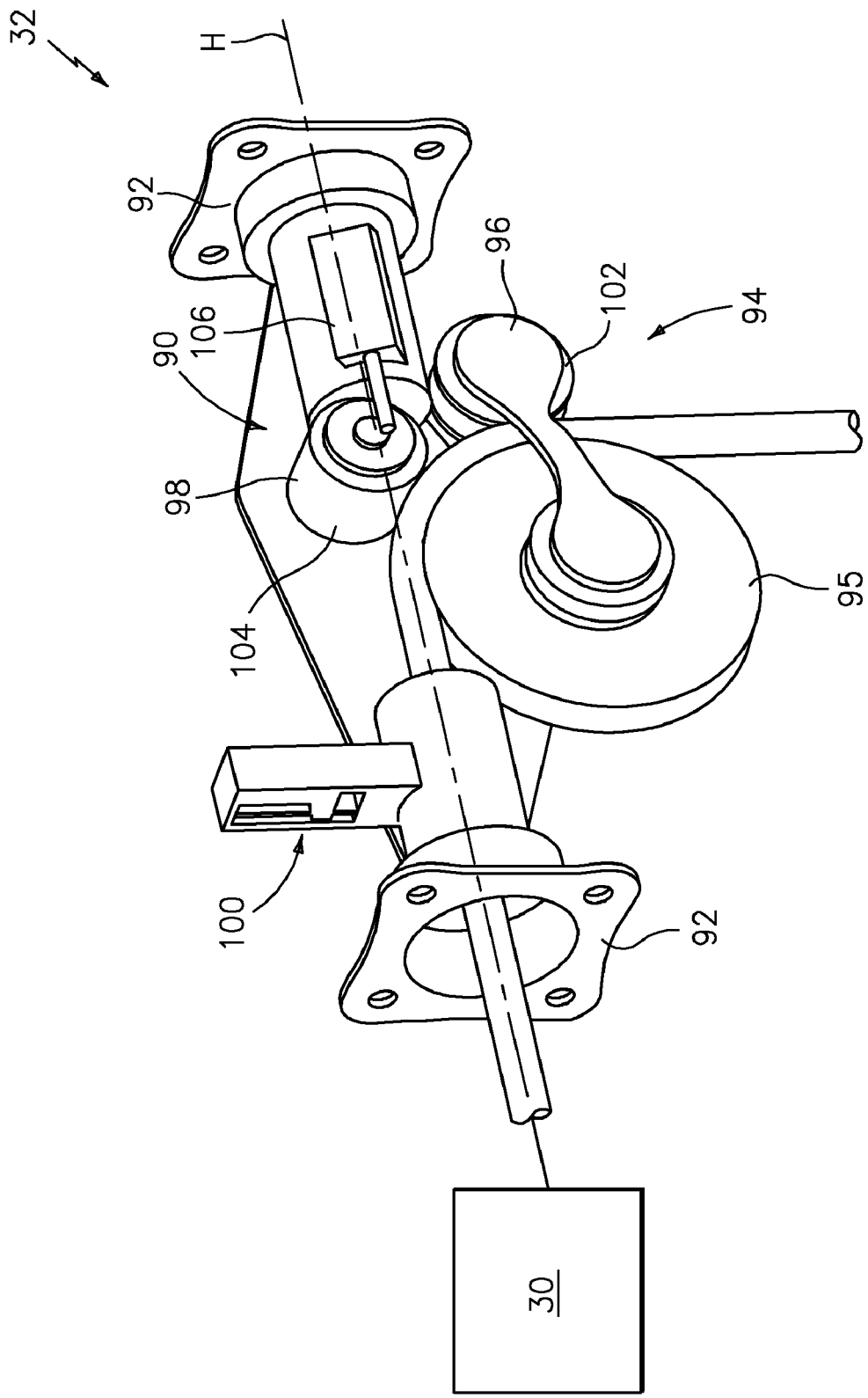
FIG. 11 is an expanded view of the deployment system of FIG. 10.

Referring to FIG. 11, the deployment system 32 includes a support beam 90 mounted between a set of pivots 92 which are mounted between airframe keel beams 14K (FIGS. 2A, 2B, 5A and 5B). The support beam 90 pivotably supports a sheave 95 aligned with the center cable of the cable helix angle created as it exits the traction drive capstan 52 of the drive system 30. This orientation reduces both cable twisting and chafing. The combination of the pivotable support beam 90 and sheave 95 create the self-aligning right angle guide 94. The sheave 95 is sized to meet the minimum rope d/D, and in said invention is equivalent to the traction drive capstan 52 and the companion cable storage drum 34 diameters. This maximizes the cable life and operational reliability.

The deployment system 32 further includes a spring loaded positioning arm 96, a powered tension roller system 98 and an emergency release guillotine system 100. The spring loaded positioning arm 96 passively facilitates the pivotable alignment of the deployment system 32 about the deployment axis H with the desired load configuration. The spring loaded positioning arm 96 includes a pulley 102 at an outer extremity thereof. The spring loaded positioning arm 96 is biased clockwise in the figure to extend the pulley 102 toward the load to align said deployment unit 32. The spring loaded positioning arm 96 facilitates pivotable movement of the deployment system 32 deployment axis H to follow, for example, the cable movement as the ground crew maneuvers the hook system. The spring bias force in the spring loaded positioning arm 96 is sized such that as the cable tension increases when a load is applied, the spring loaded positioning arm 96 deflects due to said cable 24 movement.

The powered tension roller system 98 includes a tension roller 104 and a drive motor 106 (illustrated schematically). The powered tension roller system 98 ensures that proper cable tension is maintained during the cable payout sequence. As the deployment system 32 is remotely mounted from the drive system 30, the drive motor 106 powers the tension roller 104. The tension roller 104 compensates for the loss of cable tension during low G maneuvers or when the hook system may be in contact with the ground or held by the ground crew. Out-Bound cable tension is necessary for proper operation of the capstan 52 and elimination of 'Bird Caging' on the storage drum. The powered tension roller system 98 is active during all hoisting activities.

The emergency release guillotine system 100 is integrated into the support beam 90 between the capstan 52 and the sheave 95. In an emergency, once activated, the cable need only pass by the tension roller system 98 and the spring loaded positioning arm 96, both applying minimal friction force to the system.

Figure 12:
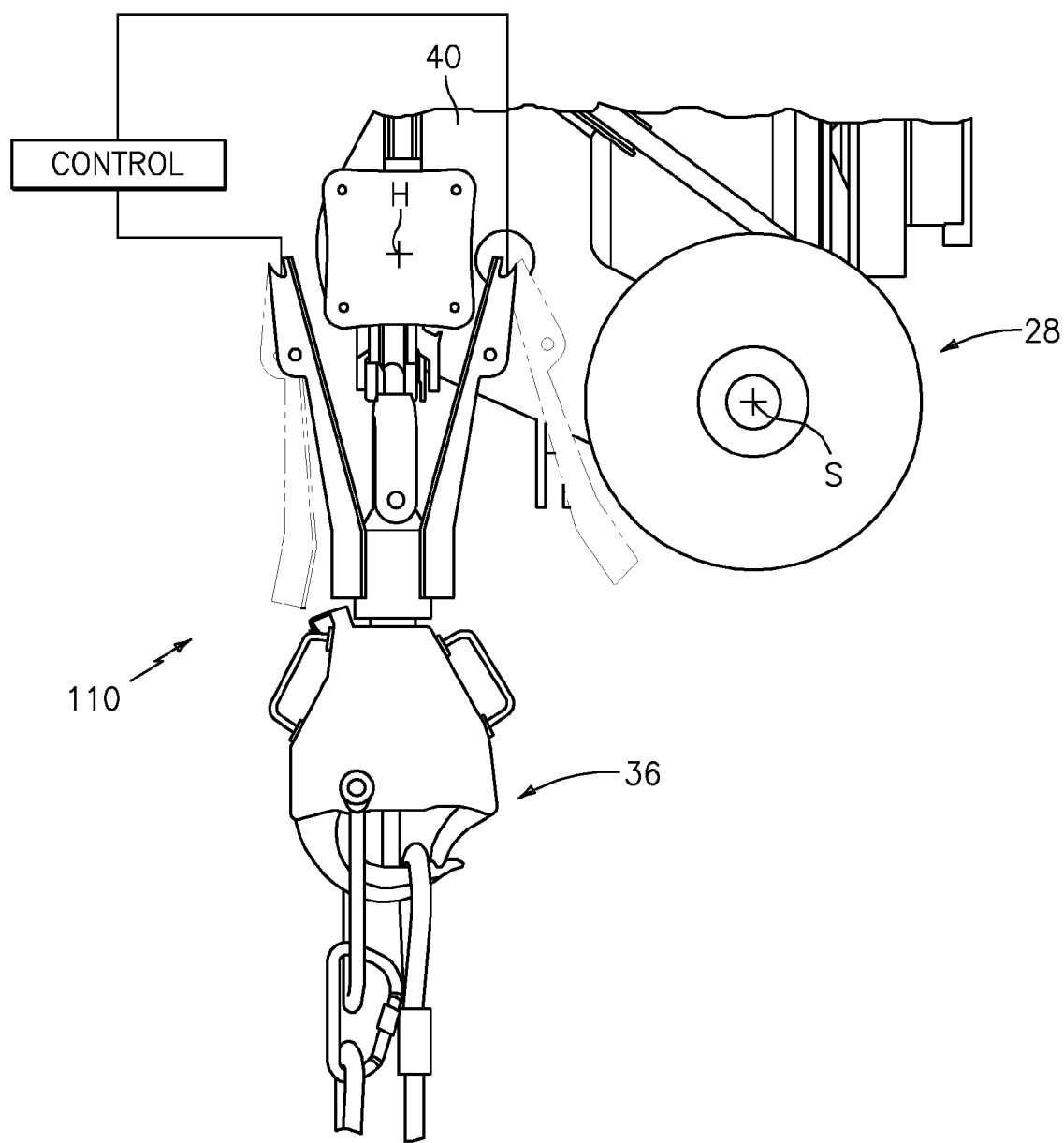
FIG. 12 is a front view illustrating a hook support saddle system moveable between a deployed position in solid and a retracted position in phantom.

Referring to FIG. 12, a hook support saddle system 110 mounted adjacent the deployment system 32 is movable between a deployed position (solid lines) and a retracted position (phantom lines). The hook support saddle system 110 grasps the hook system 36 in the idle position to constrain movement of the hook system 36 relative to the airframe 14.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A winch system comprising:
a cable storage system which defines a cable storage axis of rotation; and
a drive system which defines a drive axis of rotation transverse to said cable storage axis of rotation and transverse to a deployment axis of rotation, said drive system operable to extend and retract a cable from said cable storage system though said deployment system.

2. The system as recited in claim 1, wherein said cable storage system includes a cable storage drum which rotates about said cable storage axis of rotation.

3. The system as recited in claim 2, wherein said cable storage drum oscillates along said cable storage axis of rotation.

4. The system as recited in claim 2, further comprising a cable storage drive which rotates said cable storage drum independent of said drive system.

5. The system as recited in claim 4, wherein said cable storage drive includes a hydraulic motor.

6. The system as recited in claim 4, wherein said cable storage drive stores over 100 feet of said cable.

7. The system as recited in claim 1, further comprising a right angle sheave between said cable storage system and said drive system.

8. The system as recited in claim 1, wherein said deployment system is rated to support a maximum hook load.

9. The system as recited in claim 1, wherein said deployment system includes a sheave sized to meet a minimum rope D/d.

10. The system as recited in claim 1, wherein said deployment system comprises:
a support beam that pivotably supports a sheave about said deployment axis, said sheave aligned with a center of a cable helix angle created as said cable exits said drive system.

11. The system as recited in claim 1, further comprising a deployment system pivotable about a deployment axis parallel to said cable storage axis of rotation.

12. A winch system comprising:
a cable storage system which defines a cable storage axis of rotation; and
a drive system which defines a drive axis of rotation transverse to said cable storage axis of rotation, said drive system includes a dual mode transmission which drives a traction drive capstan about said drive axis of rotation.

13. The system as recited in claim 12, wherein said dual mode transmission is operable at a high torque/low speed mode and a low torque/high speed mode.

14. The system as recited in claim 12, wherein said dual mode transmission includes a planetary gear system input drive and a harmonic drive system final drive.

15. A winch system comprising:
a cable storage system which defines a cable storage axis of rotation;
a drive system which defines a drive axis of rotation transverse to said cable storage axis of rotation;
a deployment system pivotable about a deployment axis generally transverse to said drive axis of rotation; and
a spring loaded arm biased about an axis of rotation of said sheave, said spring loaded arm supports a pulley which retains a cable on said sheave to create a moment arm about said deployment axis, said spring loaded arm biased such that as a cable tension increases, said spring loaded arm pivots said pulley away from the cable in response thereto.

16. The system as recited in claim 15, further comprising a powered tension roller mounted adjacent said sheave to compensate for a loss of cable tension.

17. The system as recited in claim 15, wherein said deployment system includes a sheave sized to meet a minimum rope D/d.

18. A winch system comprising:
a cable storage system which defines a cable storage axis of rotation;
a drive system which defines a drive axis of rotation transverse to said cable storage axis of rotation;
a deployment system pivotable about a deployment axis generally transverse to said drive axis of rotation; and
an emergency release guillotine mounted to said deployment system.

19. A winch system comprising:
a cable storage system which defines a cable storage axis of rotation; and
a drive system which defines a drive axis of rotation transverse to said cable storage axis of rotation;
a deployment system pivotable about a deployment axis generally transverse to said drive axis of rotation and parallel to said cable storage axis of rotation;
a cable threaded from said cable storage system through said drive system and said deployment system, said drive system operable to extend and retract said cable from said cable storage system through said deployment system; and
a hook system attached to said cable, said deployment system rated to support a maximum hook load on said hook system.

20. The system as recited in claim 19, wherein said deployment axis is transverse to an aircraft longitudinal axis.

21. The system as recited in claim 19, further comprising a hook support saddle system movable between a deployed position and a retracted position, said hook support saddle system engageable whilst said hook system idle.

22. The system as recited in claim 19, further comprising a deployment system pivotable about a deployment axis parallel to said cable storage axis of rotation.

23. A VTOL aircraft comprising:
an aircraft fuselage which defines an aircraft longitudinal axis;
a cable storage system which defines a cable storage axis of rotation;
a deployment system defining a deployment axis transverse to said aircraft longitudinal axis, said deployment system rated to support a maximum hook load;
a drive system which defines a drive axis of rotation transverse to said cable storage axis of rotation and transverse to said deployment axis of rotation, said drive system operable to extend and retract a cable from said cable storage system though said deployment system.

24. The VTOL aircraft as recited in claim 23, wherein said deployment system is pivotable about said deployment axis.

25. The system as recited in claim 10, wherein said sheave is sized to meet a minimum cable d/D.

26. The system as recited in claim 10, wherein said sheave redirects said cable transverse to said deployment axis.

* * * * *